Aug. 4, 1942.   W. P. YANT ET AL   2,292,003
VALVE
Filed Oct. 12, 1939

INVENTORS
William P. Yant
John F. Dauster
BY Brown, Critchlow & Flick
their ATTORNEYS.

Patented Aug. 4, 1942

2,292,003

UNITED STATES PATENT OFFICE 2,292,003

VALVE

William P. Yant, Pittsburgh, and John F. Dauster, Wilkinsburg, Pa., assignors to Mine Safety Appliances Company, Pittsburgh, Pa., a corporation of Pennsylvania Application October 12, 1939, Serial No. 299,112

1 Claim. (Cl. 251—119)

This invention relates to valves, and, more particularly, is concerned with check valves for use in breathing apparatus.

It is the general object of our invention to provide an improved valve for use in breathing apparatus, and the like, which offers a minimum of resistance to fluid flow in one direction and a maximum resistance to flow in the other direction, and which is relatively inexpensive to manufacture and operates in a completely satisfactory manner over long periods without attention or repair.

The foregoing and other objects of our invention are achieved by the provision of a check valve comprising a flow passage, a valve seat, preferably of elliptical or semi-elliptical form, in the flow passage and inclined at an angle of materially less than 90° to the direction of fluid flow through the passage, and a flexible valve flap positioned to normally engage with the valve seat. More particularly, we may provide a pair of substantially semi-elliptical, oppositely-inclined valve seats in a flow passage, which seats intercept along a minor axis of the ellipse and form an angle of less than 180° with each other. Associated with the valve seats is a flexible member of substantially elliptical shape bent along a minor axis and positioned so that its minor axis is held substantially at the line of intersection of the valve seats and its edge portions seal with the oppositely inclined valve seats.

Figure 1:
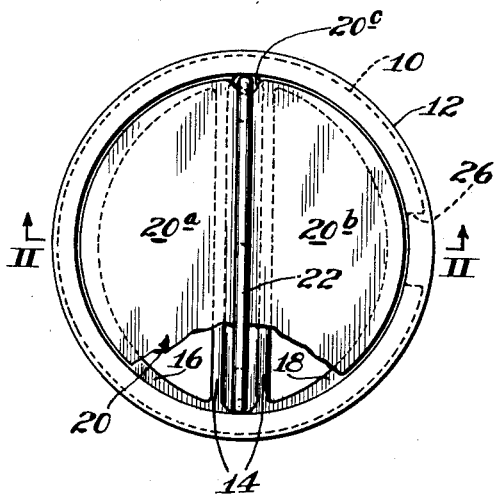
Figure 3:
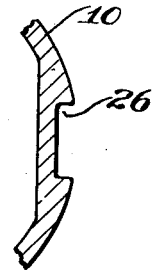
Figure 2:
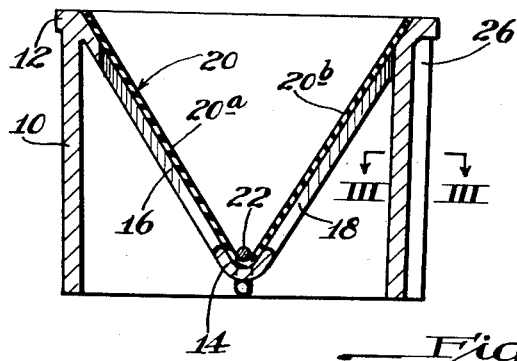
Figure 4:
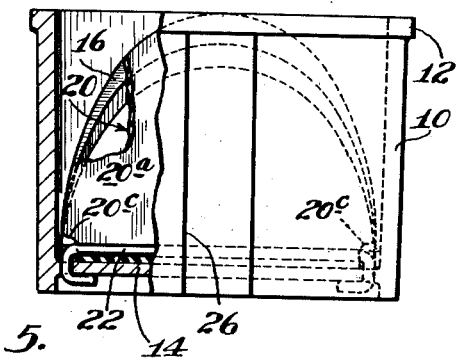
Figure 5:
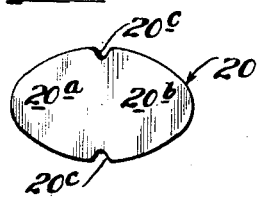

For a better understanding of our invention reference should be had to the accompanying drawing in which Fig. 1 is an end or plan elevation of our improved check valve; Fig. 2 is a diametrical vertical sectional view taken on line II—II of Fig. 1; Fig. 3 is a fragmentary horizontal sectional view taken on the line III—III of Fig. 2; Fig. 4 is a side elevation of the check valve of Fig. 1 with certain portions of the valve being broken away to illustrate the details of the valve construction, this view being taken at right angles to the view of Fig. 2; and Fig. 5 is a plan view on a smaller scale of the flattened out flap member forming a part of the valve.

Although our improved valve is adapted to be made in substantially any size and can be employed in various uses to control the flow of fluid, and specifically the flow of gas, such as air, nevertheless, our valve is particularly adapted to be used as a check valve in air filtering and purifying apparatus, and, accordingly, has been illustrated in the particular form adapted to such use.

Specifically, the numeral 10 indicates a cylindrical body having a flanged end 12 and comprising a flow passage or conduit adapted to fit into a breathing apparatus. The cylindrical body 10 is formed with a transverse bar 14 of substantially V-shape in cross section, as best illustrated in Fig. 4, and the legs or sides of the V-shaped bar are formed in alignment with and comprise a part of a pair of oppositely-inclined substantially semi-elliptical valve seats 16 and 18. Although the cylindrical body 10, bar 14, and valve seats 16 and 18 can be made of any desired material and can be in the nature of inserts or separate parts, nevertheless we conveniently mold all of these parts simultaneously from plastic material in a single casting, pressing, or molding operation.

Cooperating with the valve seats 16 and 18 is a flexible valve member or flap, indicated as a whole by the numeral 20, and including portions 20a and 20b. The valve member is of substantially elliptical shape and is made of any suitable flexible and air-impervious material. Usually, we make the valve member 20 of relatively thin rubber. The elliptical valve member 20 is secured in the region of its minor axis in the channel of the V-shaped transverse bar 14. This can be done in a number of ways but one convenient manner of achieving the desired result is to employ a wire 22 which is provided with right angle end portions which are extended through suitable openings near the ends of the transverse bar 14 and are bent over against the bottom of the bar to lock the wire 22 and thus the valve member 20 in position. The sides of the valve member 20 are notched as at 20c to receive the ends of the locking wire 22 (see Fig. 5). Although often unnecessary, we may seal the ends of the wire 22 with respect to the holes in the ends of the transverse bar 14 by covering the ends of the wire 22 which extend to the bottom of the transverse bar 14 with any suitable sealing material.

In the manufacture of the valve member 20 we preferably mold it so that it is normally bent along its minor axis so that it normally and without distortion fits down into the transverse bar 14 and substantially in the position shown in Fig. 2 without the locking wire 22 being in place. When the valve member 20 is formed in this manner the edges of the member engage in sealing relation with valve seats 16 and 18 with only a relatively light pressure or even with substantially no pressure. However, we contemplate making the valve member 20 flat and bending it to its V-shaped position by means of the locking wire 22 in the assembling of the valve. When this is done the portions 20a and 20b of the valve member are held in somewhat firmer relation and with considerably more sealing pressure against the valve seats 16 and 18.

If our improved check valve is operated in a vertical position, as shown in Figs. 2 and 4 of the drawing, the weight of gravity assists in holding the valve portions 20a and 20b in sealing relation with the valve seats 16 and 18. However, when our improved valve is employed in a horizontal position, we have found it advisable to position the valve so that the transverse bar 14 is in a substantially vertical position. To insure this operation we form a positioning slot or keyway 26 on the side of the body 10 and the slot 26 should be positioned to the side of the cylindrical body 10 in the use of the valve. This insures that the valve portions 20a and 20b are in substantially a vertical plane and the tendency of gravity to hold these portions away from the valve seats is negligible.

From the foregoing, it will be recognized that the objects of our invention have been achieved by the provision of a simplified and improved check valve which is relatively inexpensive to manufacture and which can be used for long periods without attention or repair. Our improved valve operates to offer a maximum resistance to fluid flow in one direction and a minimum of resistance to fluid flow in the opposite direction. Particularly, and having reference to the showing of our valve in Fig. 2, flow of fluid through the valve from the top to the bottom is substantially and usually absolutely prevented because the pressure of the fluid presses the flat portions 20a and 20b tightly against the valve seats 16 and 18. However, our improved valve offers a minimum of resistance to the flow of fluid in the opposite direction. This is because the fluid acts over the inclined surfaces of the portions 20a and 20b of the valve member 20 and thus exerts a pressure tending to lift these portions of the valve member off the seats.

We have found that by positioning the valve seats at an angle of considerably less than 90° with the axis of the flow passage and making them elliptical or semi-elliptical an enlarged valve area is provided for a given flow passage size and the same fluid pressure acting over this greater area moves the portions of the valve more readily off their seats. Actually, instead of the same pressure being required to move the valve portions off their seats a lesser pressure over a greater area effects the same result. Thus for a given size flow passage we provide a check valve which offers a maximum size valve area and a minimum resistance to fluid flow. By making two oppositely inclined valve seats in a single flow passage the fluid pressure forces on the valve member or flap 20 are counterbalanced so as to avoid any tendency to move or displace the valve member in the rapid change of the direction of fluid flow which often occurs with high frequency in a check valve employed in breathing apparatus.

Although in accordance with the patent statutes we have specifically illustrated and described our invention, it will be understood that we are not limited thereto or thereby but that the scope of our invention is defined in the appended claim.

We claim:

A check valve comprising a cylindrical member provided interiorly with a pair of semi-elliptical valve seats extending inwardly toward each other at angles oblique to the axis of said member, the inner ends of said seats being joined together and forming a channel-like bar extending across the center of said member with its ends provided with openings inside said member, a substantially elliptical thin flexible closure member bent transversely across its center for engagement with said bar and seats, the ends of the central portion of the closure member being provided with openings registering with said bar openings, and a wire extending across said central portion with its ends projecting through said openings and bent beneath the bar whereby said closure member is clamped against the bar, said flexible closure member being formed to fold together in the center of said cylindrical member and within the projected area of said bar when subjected to slight fluid pressure whereby the bar is the only transverse obstruction in the center of said cylindrical member when the valve is wide open.

WILLIAM P. YANT.
JOHN F. DAUSTER.